Patented Feb. 24, 1931

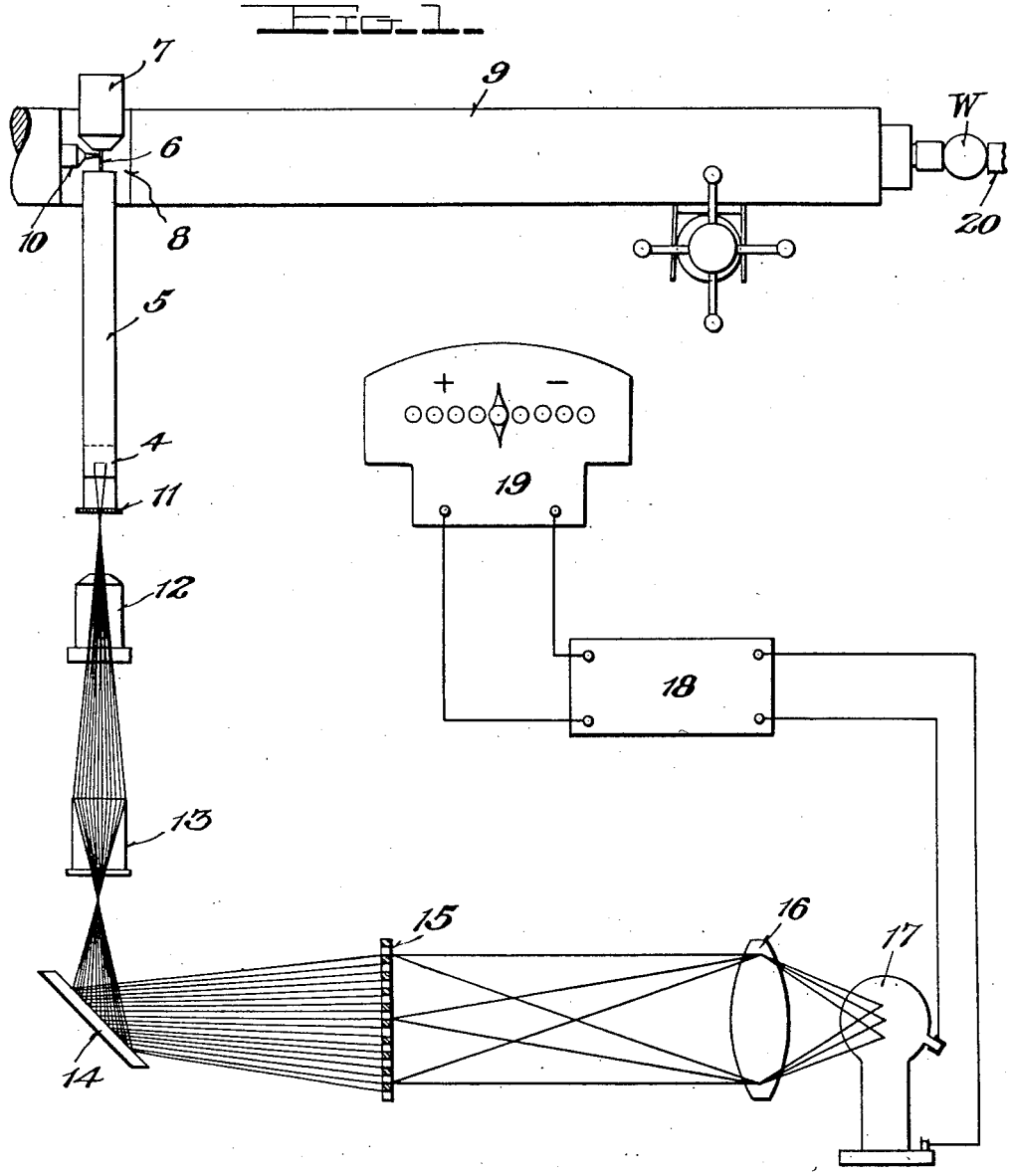

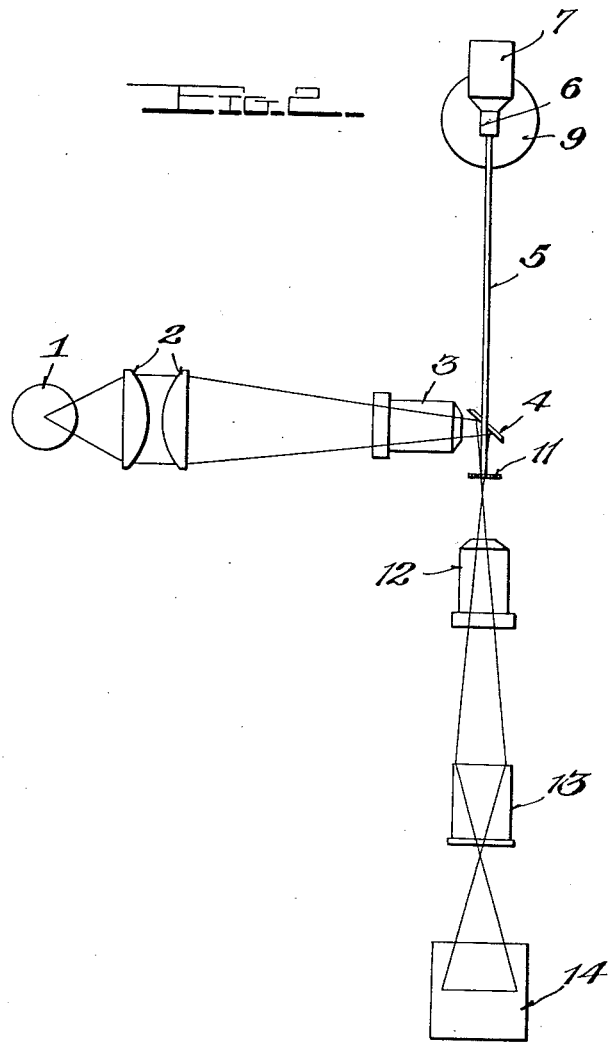

1,794,340

UNITED STATES PATENT OFFICE

MALCOLM K. PARKHURST, OF NEW YORK, N. Y., ASSIGNOR TO BROWN & SHARPE MFG. CO., OF PROVIDENCE, RHODE ISLAND

OPTICAL MEASURING DEVICE

Application filed December 28, 1928. Serial No. 328,984.

This invention relates to optical measuring devices and the primary object thereof is to provide novel means for obtaining measurements by means of light rays which latter effect operation of the reading meter.

In the drawings:—

Figure 1 is a side plan view of the invention, and

Figure 2 is an end elevation of the invention.

In proceeding in accordance with the present invention, a source of light 1 is employed the rays from which pass through condensing lenses 2 and through an objective 3. The light rays from the objective in turn pass to a small reflector 4, which reflector is carried by a suspension arm 5. The arm 5 is secured to a suspension spring 6, the latter in turn being secured to a fixed member 7, in a manner so as to support and hold the arm 5 in a slightly angular position to the left of Figure 1. The spring 6 and the confronting ends of the arm 5 and member 7 loosely extend into a cutout 8 provided in a work engaging spindle 9. The spindle 9 has a contact point 10 secured in its cutout 8 and in a position to engage the suspension spring 6 upon movement of the spindle 9 to the right of Figure 1.

Below the reflector 4 a small screen or grating 11 is disposed, and through which the rays of light from the reflector 4 pass. The light rays after passing through the screen or grating 11 are passed through an objective 12, thence through an eye piece 13, which latter focuses the rays onto a large reflector 14. The light rays from the reflector 14 are projected through a large screen or grating 15 and from the latter the rays pass through a focusing lens 16, the lens 16 focusing the rays upon the photoelectric cell 17, thereby establishing an electrical circuit through an amplifier 18 and meter 19, causing movement of the indicator in the meter, which indicates the extent of movement of the spindle 9.

As shown in Figure 1, the work W to be measured is supposed to be accurate in measurement to the master piece and therefore is in contact with the fixed point 20 and the adjacent end of the spindle 9, also the contact point 10 has moved the arm 5 to a perpendicular position by reason of its contact with the spring 6 and the rays of light pass downwardly in a straight line causing the indicator to show zero or exact center.

However if the work W is larger than the master piece the spindle will have contacted with the same and contact point 10 will have moved the arm 5 to a position indicating plus reading on the meter or how much larger the piece is, and, of course, if the piece to be measured is smaller than the master piece, the indicator will pass beyond the zero mark indicating that the work is minus. In this regard it will be understood that the meter indicates extremely small measurement, that is, fractions often thousandths of inches. In the aforesaid movement of the spindle 9 it is to be understood that the point 10 of the spindle engages the suspension spring 6 and causes the arm 5 to be deflected, whereby the light rays passing through the screen 11 will pass through the large screen 15 at varying angles, determined by the extent of movement of the contact point 10, so that the action of the light rays in the photo electric cell will be varied accordingly, with corresponding variations in the reading of the meter.

The arm 5 is given movement by an eccentric 21 or other similar and well known device.

Having thus described my invention what I claim as new and desire to secure by Letters Patent is:—

1. In a measuring device, a movable work engaging member having a cut-out and having a contact point in the cut-out, a fixed member having a suspension spring engageable with the contact point, an arm suspended from the spring and having a reflector and a screen thereon, an objective adjacent the reflector, a source of light arranged to transmit its rays through the objective and against the reflector and through the screen, a second objective arranged to receive light rays from the screen, a focusing device to receive the rays from the second objective, a large screen, a reflector to direct the rays from the focusing device through the large screen, an electrically operated meter, and means to receive the rays from the large screen to operate the meter.

2. In a measuring device, a movable work engaging member, a screen, means to suspend the screen from a fixed point, means carried by said member and movable therewith to engage and move said screen suspending means, a source of light, an objective aligned with said source of light, means to transmit the light rays from said objective through the screen, a second objective to receive the light rays from the screen, a large screen, means to transmit the light rays from the second objective through the large screen, a meter, and means operable by the light rays from the large screen to actuate the meter.

3. In a measuring device, a pair of fixed objectives, a screen having a plurality of light passages therethrough associated with each objective, a meter, a source of light, means to direct the light from said source through both of the screens, means operable by the light issuing from one of the screens to actuate the meter, movable work engaging means, and means operable by the movements of the work engaging means to move one of the screens relative to the other thereby to vary the light rays.

4. In a measuring device, a source of light, a pair of fixed objectives arranged to receive light rays from said source, a meter, means associated with each objective to screen the light, said last named means having a plurality of light passages therethrough, means to operate the meter in accordance with the screening of the light, movable work engaging means, and means to move one of the screening means relative to the other by movements of said work engaging means thereby to vary the screenings of the light rays.

5. In a measuring device, a pair of relatively fixed objectives, a source of light, light screening means having a plurality of light passages therethrough receiving light from said source, a meter operable by the light from said screening means, movable work engaging means, and means operable by the movements of the work engaging means to vary the screening of the light thereby to vary the meter operations.

6. In a measuring device, a source of light, independent light screening means formed with a plurality of light passages for receiving light rays from said source, an indicator operable by the light rays from said screening means, movable work engaging means, and means to effect relative movement between the light screening means by the work engaging means thereby to vary the screening of the light and accordingly operation of the indicator.

7. In a measuring device, a source of light, a fixed and a movable screen receiving light from said source, said screens being formed with a plurality of light passages, an indicator operable by the light from said screens, movable work engaging means, and means to effect movement of said movable screen by the work engaging means thereby to vary the screening of the light and accordingly the operation of the indicator.

8. In a measuring device, a source of light, a pair of fixed objectives receiving light from said source, a screen associated with each objective and being formed with a plurality of light passages, movable work engaging means, an indicator, means to actuate the indicator by the screened light, and means to effect movement of one of the screens by said work engaging means thereby to vary the screening of the light and accordingly operation of the indicator.

9. In a measuring device, a screen, means to suspend the screen from a fixed point, a movable work engaging member associated with said screen for moving the latter about its point of suspension, a source of light, an objective aligned with said source of light, means to direct the light rays from said objective through the screen, a meter, and means operable by the light rays from said screen to actuate the meter.

10. In a measuring device, a screen, a movable work engaging member having an opening therethrough, means for suspending said screen extending through said opening, the walls defining the opening being adapted to engage the suspension means to move the screen predetermined distances about its point of suspension, a source of light, an objective aligned with said source of light, means to direct the light rays from said objective through the screen, a meter, and means operable by the light rays from said screen to actuate the meter.

In testimony whereof I have signed my name to this specification.

MALCOLM K. PARKHURST.